Dec. 30, 1930.   A. SGRITTA   1,786,634
AUTOMATIC NIGHT CANDLE MOLDING MACHINE
Filed Aug. 31, 1928   6 Sheets-Sheet 3

Inventor
Alfonso Sgritta
By his Attorneys
Beeler & Schumacher

Dec. 30, 1930.  A. SGRITTA  1,786,634
AUTOMATIC NIGHT CANDLE MOLDING MACHINE
Filed Aug. 31, 1928   6 Sheets-Sheet 4
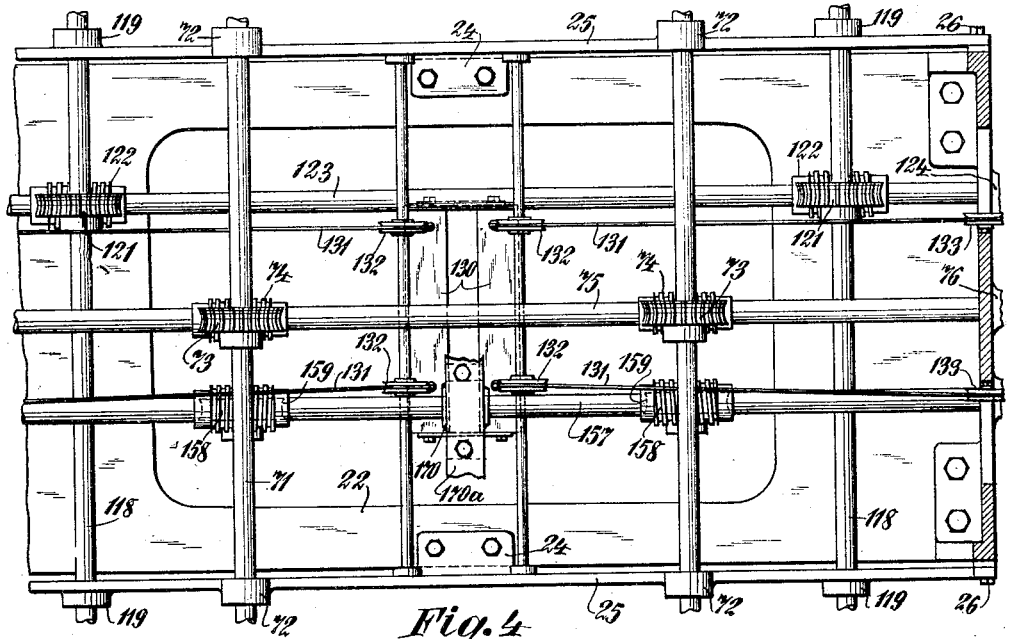
Fig. 4
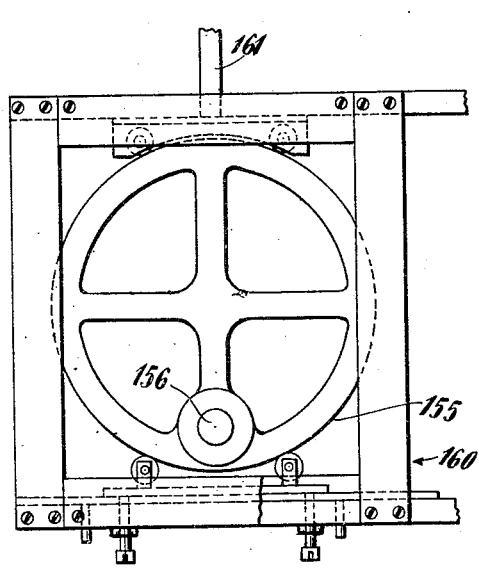
Fig. 5
Fig. 6
Inventor
Alfonso Sgritta
By his Attorneys
Beeler & Schumacher Dec. 30, 1930.  A. SGRITTA  1,786,634
AUTOMATIC NIGHT CANDLE MOLDING MACHINE
Filed Aug. 31, 1928    6 Sheets-Sheet 5
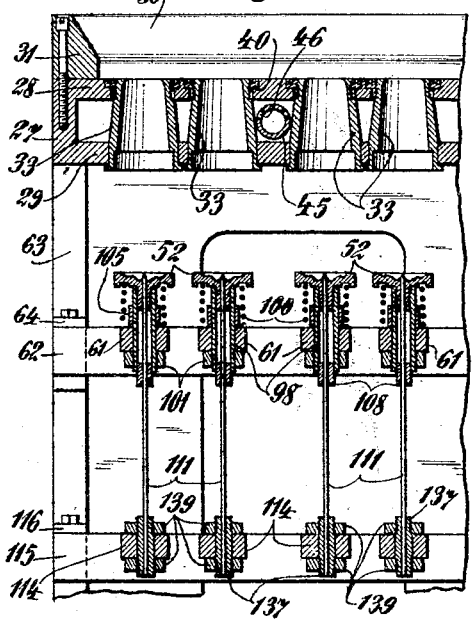
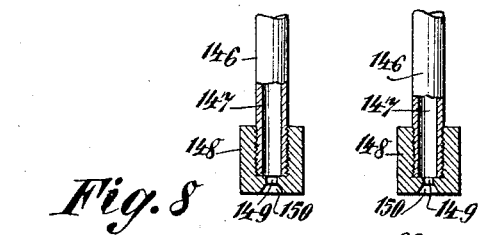
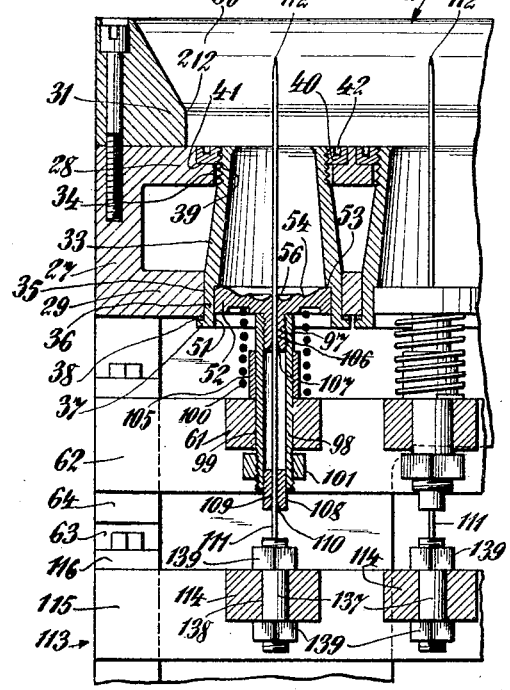
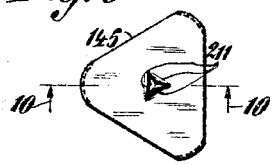
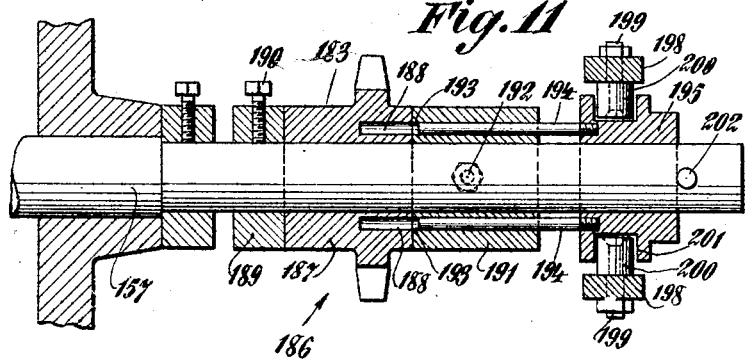

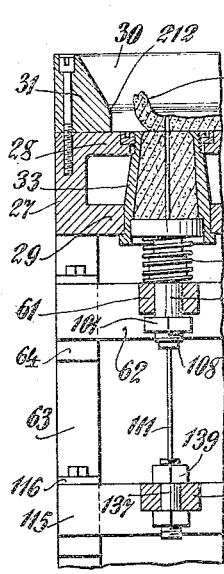
Fig.12
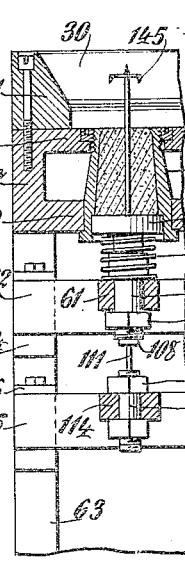
Fig.13
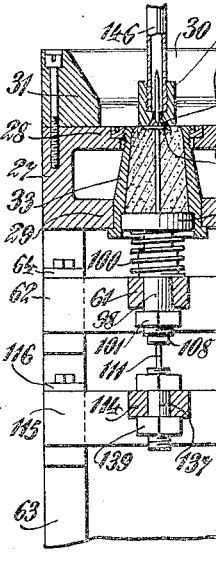
Fig.14
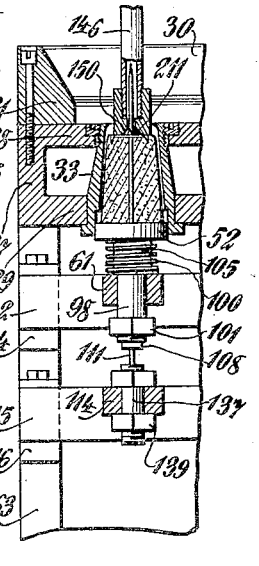
Fig.15
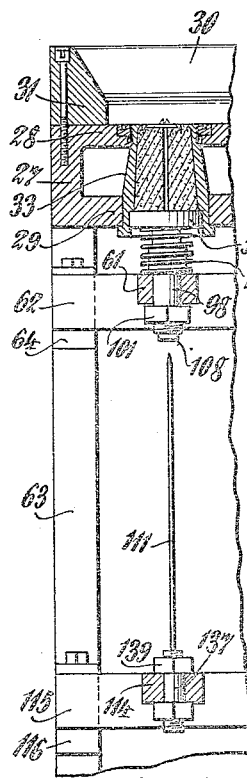
Fig.16
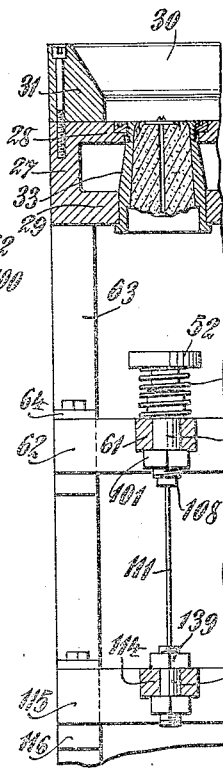
Fig.17
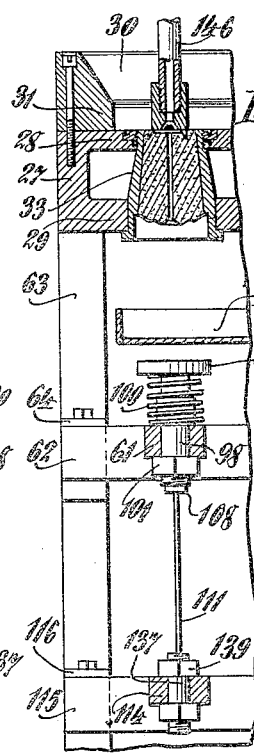
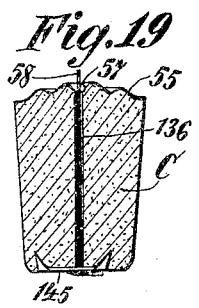
Fig.19

Patented Dec. 30, 1930

1,786,634

UNITED STATES PATENT OFFICE

ALFONSO SGRITTA, OF BROOKLYN, NEW YORK

AUTOMATIC NIGHT-CANDLE-MOLDING MACHINE

Application filed August 31, 1928. Serial No. 303,196.

This invention relates to molding machines and processes, and has particular reference to the art that relates to the manufacturing of night candles.

One object of the invention is to provide an improved machine for molding articles of any desired substance, and especially of a compartively soft material, regardless of the construction or shape of the articles, but especially where the same are hollow, or of a tapered form, or have one finished or ornamental surface and another relatively unfinished surface, or simply one surface of comparatively uniform character, or possess any combination of these features.

Another object of the invention is the provision of an improved process for molding articles having characteristics above referred to, and which process is simple and efficient in practice.

A further object of the invention is to construct an improved machine of the type mentioned for the automatic molding of night candles, wherein the upper ornamental ends of the candles are neatly formed, while the lower ends are made by a substantially simultaneous removal of the excess candle material that has solidified over the molds, the hollow in the candles for receiving the wicks having been previously formed.

A further object of the invention is to provide an improved machine for the molding of night candles wherein the candles are molded with their upper ends lowermost, and the wick holding clips are applied to the candles while the latter are positioned in the molds, the means for applying the clips having unique coaction for removing the candles from the molds.

Further objects of the invention are to provide an improved candle, having a central wick opening of considerable larger size than the wick, and which candle has a countersink to facilitate the threading of the wick into the candle; and wherein an improved clip for anchoring the wick in candle is provided.

Generally described, the invention provides a machine and process, which in whole or in part, are adapted to be used in the molding of articles of various substances, whether candle material, paraffin, asphaltum, cement, composition materials and metals of both high and low melting points. The particular machine herein shown and described is merely illustrative of the application of the invention to the manufacture of night candles. A night candle has an upper ornamental end of relatively smooth finish, and may have a lower end of unfinished appearance. The candle tapers, being smaller at the lower end thereof. It has an axial opening through which the wick freely passes, and at its lower end is a clip for engaging the wick to anchor the same in the candle.

The molds of the machine are so disposed as to cause the candles to be molded in inverted position, and are water-jacketed for rapid cooling and solidification of the wax. Each mold is equipped at its bottom with a movable closure cap, which is resiliently engaged to close the mold. Communicating with the molds, is a pan for receiving the molten wax, and whence the wax flows into the molds. To provide a central wick receiving hollow in the candles, cores or pins are axially mounted for movement through the closure caps and the molds, and with their upper ends extending into the said pan. The pins are then retracted with their ends out of the said pan, and the wax that has solidified therein and above the molds is removed by any suitable scraping tool, which is large and is readily passed over the smooth bottom surface of the pan for simultaneous action at a plurality of molds, whereby the upper ends of the candles are formed. After this operation the body of the candle is complete, and has the central opening therein running clear and unobstructed from end to end thereof. The pins are again moved upward, and the wick holding clips placed on the ends of the pins. Thereafter a plurality of hammers descend, which centrally receive the pins and bear down on the clips. The pins thus pass through the openings in the clips, and spread the wick holding prongs thereof. Rapidly the hammers strike the clips to engage the ends of the candles. At this movement the candles are, due to the impact with the hammers, caused to move downward in their molds, with a similar movement of the closure caps, and deflection of their supporting springs. Finally the caps are positively stopped in their downward movement, permitting the hammers to drive the clips into secure engagement with the candles. Now the hammers move upward, whereupon the springs return the closure caps into their original position, and with the candles again in snug contact with the molds. Also the pins are lowered entirely out of the molds. Thereafter, the closure caps are lowered away from the molds, and a tray placed beneath the molds and over the closure caps. Again the hammers are reciprocated downward but this time merely to tap the candles out of the molds and into the tray. The candles are now ready for the wick threading operation which is performed by a machine that constitutes the subject matter of a copending application for patent.

The mechanism for the actuation of the parts above set forth includes separately reciprocable frames for the hammers, the pins, and the closure caps, respectively. The same may be counterweighted, and operated by balanced cam drives.

It is therefore a further object of the invention to provide an improved machine for molding candles according to the method hereinbefore outlined, which machine is durable, and relatively simple in its construction and movements.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

In the drawings:

Fig. 4 is a fragmentary plan of the main drive shafts, taken on the line 4—4 of Fig. 1.

Fig. 5 is an enlarged view in side elevation of a cam and follower detail.

Fig. 6 is an edge view of the same.

Fig. 7 is a fragmentary enlarged vertical section taken on line 7—7 of Fig. 1, showing the closure caps and pins in depressed position.

Fig. 8 is a similar view, further enlarged, showing the molds ready to receive the wax.

Fig. 9 is a plan view of a wick holding a clip ready to be placed on a pin for engagement with a candle.

Fig. 10 is a section taken on line 10—10 of Fig. 9.

Fig. 11 is an enlarged horizontal section taken on line 11—11 of Fig. 1, and showing a clutch.

Figs. 12 to 18 are similar fragmentary sections showing the steps in the molding process and operation of the machine, following Fig. 8.

Fig. 19 is a vertical section of a candle made according to my invention.

Figure 1:
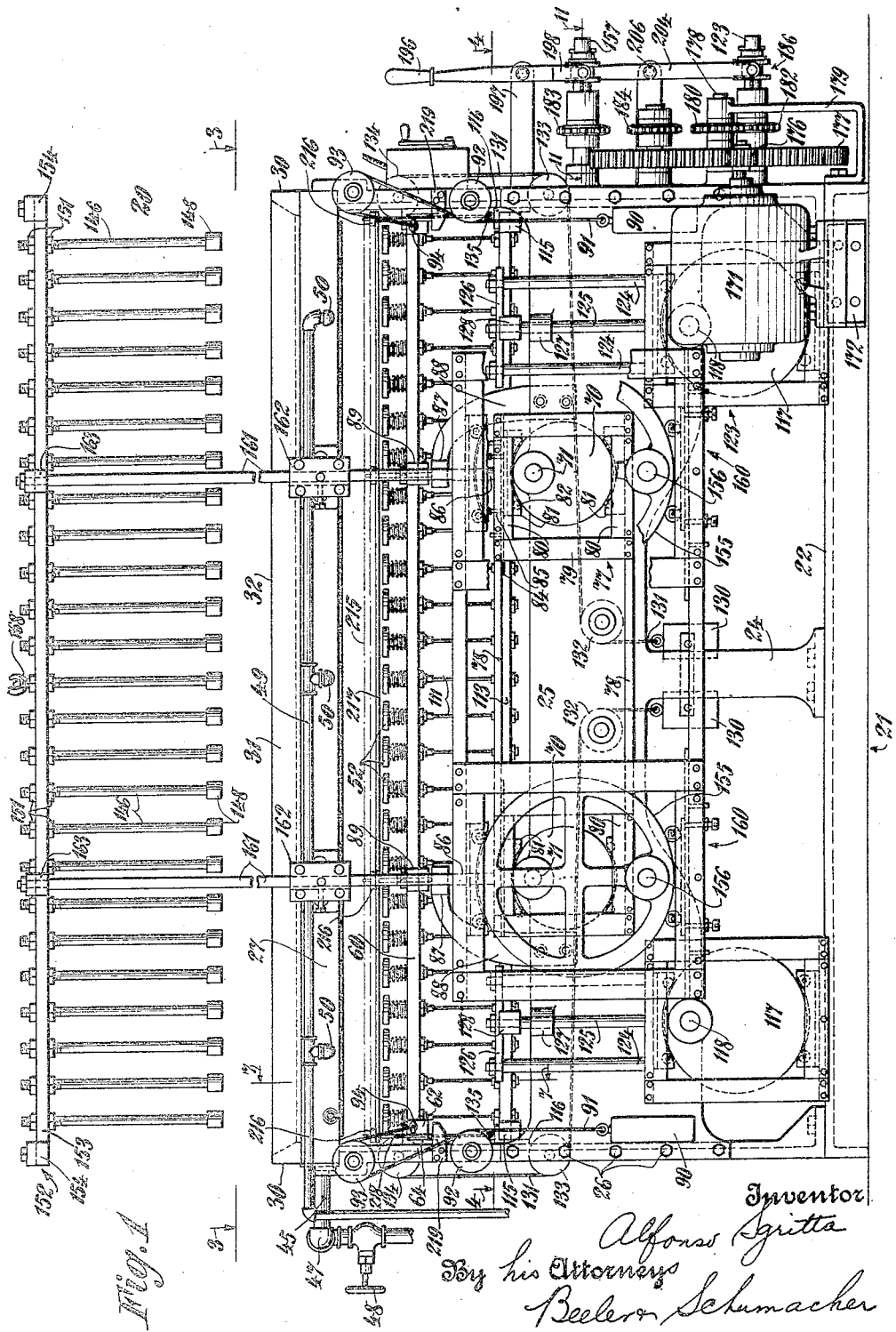
Figure 1 is a view in side elevation of a machine embodying the invention.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 20 denotes a machine embodying the invention. The same includes a frame 21, having a base plate 22, from which extend upwardly, the end frame members 23. Intermediate the same are stanchions 24, which are also mounted on the said base 22. Formed integrally with the said members are supporting plates 25 which extend along the sides of the machine from end to end of the same, and are bolted at 26.

Mounted on the upper part of the machine frame, and substantially coextensive therewith, is a horizontal water jacket 27. The same is rectangular in form, and has upper and lower walls 28, 29.

Extending along the edges of the water jacket are end and side walls 30, 31, which form with the upper wall 28, a pan 32 for the reception of the molten wax.

Perforating the water jacket 27, are a plurality of molds 33, from which the cooling medium extracts heat to cause rapid solidification of the wax in the molds. Each mold is of tubular form, and has its axis vertical. The diameter of the upper end of the mold is smaller than that of the lower to conform to the desired shape of the inverted candle. The openings 34, 35 in the walls are of different sizes to accord with the end of the mold received therein. At its lower end, each mold has a cylindrical wall portion 36 which is snugly fitted in the opening 35. The said wall portion 36 terminates in an outward, annular abutment lip 37. Packing 38 acts between said lip and the adjacent wall 29 of the water jacket. The upper end of each mold is exteriorly threaded at 39 to engage a ring locknut 40 which seats in an annular counterbore 41 in the wall 28. The said ring has a plurality of spaced recessses 42 for coaction with a proper wrench. By screwing up on the locknut, a water tight connection is afforded as between the mold and the water jacket. It is noted that the upper end of the mold terminates in the plane of the bottom of the pan 32, or at any rate, does not extend above said bottom.

For efficient cooling of the molds with a minimum of water pressure in the water jacket, sprinkler pipes 45 are employed, which extend through the water jacket lengthwise of the machine. To accommodate the pipes, the molds are arranged in groups of two rows at the sides of the machine, and three rows at the center thereof, and between the said groups the pipes are disposed. Each pipe has upwardly directed discharge openings 46 which make angles of 60 degrees with the vertical. Thus the water is sprayed on the upper parts of the molds and flows down therealong. The sprinkler pipes connect into an inlet header 47 outside of the machine, and the supply of water is controlled by a main valve 48. The water is drained from the jacket by a pipe 49 having branch connections with the jacket at 50. The sprinkler action promotes circulation of the water and assures proper and uniform cooling of the molds.

Each mold 33 has it cylindrical wall portion 36 counterbored at 51 to slidingly receive a circular closure member 52. The peripheral portion of the latter is engageable with a seat 53 in the counterbore. The said closure member has an upper ornamental surface 54, constituted preferably of a plurality of concentric zones, diminishing in elevation toward the center, to accord with the upper end 55 of a night candle C. At its center, the said closure member has a raised conical portion 56 to mold a countersink 57 in the said night candle, to facilitate the threading of the wick 58 thereinto.

All the closure members 52 are mounted on a frame or table 60 comprising bars 61 which extend lengthwise of the machine, and correspond to the rows of closure members alining with the molds 33. At their ends, the said bars 61 are secured to cross members 62. The latter having sliding coaction with vertical guides 63 of the end walls of the machine, by means of angle shoes 64, or the like.

To raise or lower the table 60, for operation of the closure caps 52, any suitable drive is provided, including cams 70. There are two of these cams on each side of the machine, and they were spaced to properly distribute the load. The cams are mounted on shafts 71, which extend through the machine beneath the molding apparatus. The shafts 71 are journaled in bearings 72 in the side frames 25. Each of the shafts has a central worm wheel 73, the teeth of which mesh with those of worms 74 on a central drive shaft 75, that extends lengthwise of the machine beneath the shafts 71, and is journaled in bearings 76. The members 73, 74 are designed to impart rotation in opposite directions to the shafts 71, to the end that the action of cams 70 may be balanced. Coacting with each cam 70 is a follower construction 77. The latter is of box form, and includes the upper and lower bars 78 that extend from cam to cam. Vertical bars 79 are secured to opposite sides of the horizontal bars 78, thus providing a space therebetween in which the cam 70 may move. Guide members 80 extending between the bars 79 are fastened to opposite sides of the upper and lower bars 78 to form channel guides. The latter receive followers 81 which have each a plurality of rollers 82 to coact with the cam 70. Rotation of the cams causes the said followers to reciprocate in a horizontal direction, and to impart a vertical reciprocatory movement to the table 60, as hereinafter described. To assure operation with a minimum clearance, a liner 84 may co-operate with one of the followers 81, said liner being adjusted by set screws 85.

Extending upward from each follower structure 77 is a bar 86, the same being vertically slidable in an arm 87 of a bracket 88. The table 60 is secured to the crosswise bars 89 of the said table whereby the cam is effective to vertically reciprocate the said table. To minimize the wear on the cams 70, counterweights 90 are provided, these being disposed either along the sides of the machine or interiorly thereof. They are suspended from tension members 91 that coact with guide pulleys 92 and take over pulleys 93; whence they are fastened at 94 to the end bars 62 of the table 60.

Referring now to the specific movement of the closure members 52, the same are each provided with a threaded extension 97 to engage in a tubular member 98 which is mounted for vertically sliding movement in a hole 99 of a bar 61. An expansion coil spring 100 tends to move the closure member upward with respect to the bar 61, this movement being limited by a nut 101 threaded onto the lower end of the member 98. In the uppermost position of the table 60, the closure members, as shown in Fig. 8, are urged by springs 100 into snug contact with the seats 53 in the molds 33, the springs being under a predetermined deflection. In Figs. 1 and 17, for example, is illustrated the lowermost position of the closure members. In Fig. 15 the closure members are shown depressed at the instant that the hammers drive the clips home. The table 60 is in its uppermost position, but the springs 100 have been compressed, permitting the closure members to move downward with respect to the said table, and into abutment with sleeves 105 that surround the tubular members 98 and rest on the bars 61. Thus a positive support is provided to permit effective action of the hammers.

Each closure member 52 has an axial passage 106 that is countersunk at 107. At its lower end, each tubular member 98 has a guide portion 108 set thereinto in any suitable manner, the said guide portion having an axial passage 109 in alinement with 106, and countersunk at 110. Thus provision is made for central movement of the pins 111 into and out of the mold through passages 106 and 109, as hereinafter more fully described.

In Fig. 8 the molding apparatus is shown ready to receive the molten wax for making the night candles. It is noted that in this position the pins or cores 111 extend axially through the molds, and with their upper ends 112 projecting into the pan 32. The pins are now at their uppermost point of travel. They are carried by a table or frame 113, which includes bars 114 running lengthwise of the machine, and upon which the pins are centrally mounted in alinement with the molds 33. At their ends, the bars 114 are secured together by cross bars 115, having angle shoes 116 for sliding engagement with the end walls of the machine. To raise or lower the table 113, cams 117 are provided at the sides of the machine adjacent to the ends thereof. The said cams are mounted on shafts 118 which extend transversely of the machine and are journaled on bearings 119 in the frame thereof. Each of the said shafts has a worm wheel 121 thereon, the teeth of which mesh with those of worms 122 on a shaft 123 that extends lengthwise of the machine. Supporting the drive shaft 123 are bearings 124 in the end frame portions of the machine. It will be noted that the members 121, 122 are designed to cause shafts 118 to rotate oppositely for balanced action. Coacting with each cam 117 is a follower structure 123 similar in all respects to that hereinbefore described for cam 70. Secured to the upper end of the structure 123 are a plurality of vertical bars 124, 125, whose upper ends are braced by a cross member 126. The center bar 125 constitutes a guide which is slidable in an eye 127 of the machine frame. A cross bar 128 is connected to the members 125, 126 and to the table 113 to cause the latter to reciprocate on rotation of the cams 117. Counterweights 130 may be provided for the table 113, said counterweights being suspended preferably within the machine by tension means 131 taking around pulleys 132, and extending thence to the ends of the machine to engage pulleys 133, then upward and around pulleys 134, and being finally secured at 135 to the said table.

The pins 111 are made of any suitable material, preferably steel, and are of a thickness to mold in candle C a passage 136 of the requisite diameter. The pins are uniformly straight throughout, and their upper ends are pointed as shown. At their lower ends, the pins are connected with a force fit in the sleeves 137. The latter extend through holes 138 in the bars 114, and are secured by upper and lower locknuts 139 threaded onto the sleeves 137. When both the pins 111 and the closure members 52 are lowered, their relative position is as shown in Fig. 7, wherein the points of the pins lie substantially within the closure members. When the latter are elevated, while the pins are in lowered position, the relative positions of the parts is shown in Fig. 16, wherein the ends of the pins are free. For purposes of alinement, the pins are guided in course of their upward movement by the countersinks 107 and 110.

For drawing the wick holding clips 145 into engagement with candles C, hammers 146 are provided. Each of the hammers comprises a tubular shank 147, in alinement with a mold 33. Threaded onto the lower end of the shank is a head 148, having an axial opening 149, and a countersink 150. The upper end of the shank is secured by locknuts 151 to a table or frame 152, as, for example, to bars 153 extending longitudinally of the machine, and connected together at their ends by cross bars 154.

To vertically reciprocate the table 152, cams 155 are provided at the slides of the machine, and mounted on shafts 156. The latter are driven by a shaft 157, having worms 158, the teeth of which mesh with those of worm wheels 159 on shafts 156. The members 158 and 159 are designed to cause the shafts 156 to rotate in opposite directions for a balanced action. Coacting with the cams 155 are follower structures 160, which are similar to those described for cams 70. Extending upward from 160 are vertical bars 161 which are slidably retained in brackets 162 secured to the machine. The upper ends of bars 161 are connected to cross bars 163 of the table 152. A counterweight 164 is suspended from a tension member 165 that takes over pulleys 166, 167, and is connected centrally to table 152 at 168. The pulleys 166, 167 may be mounted on any convenient overhead beam. The counterweight may also be arranged to be suspended within the machine itself.

Figure 2:
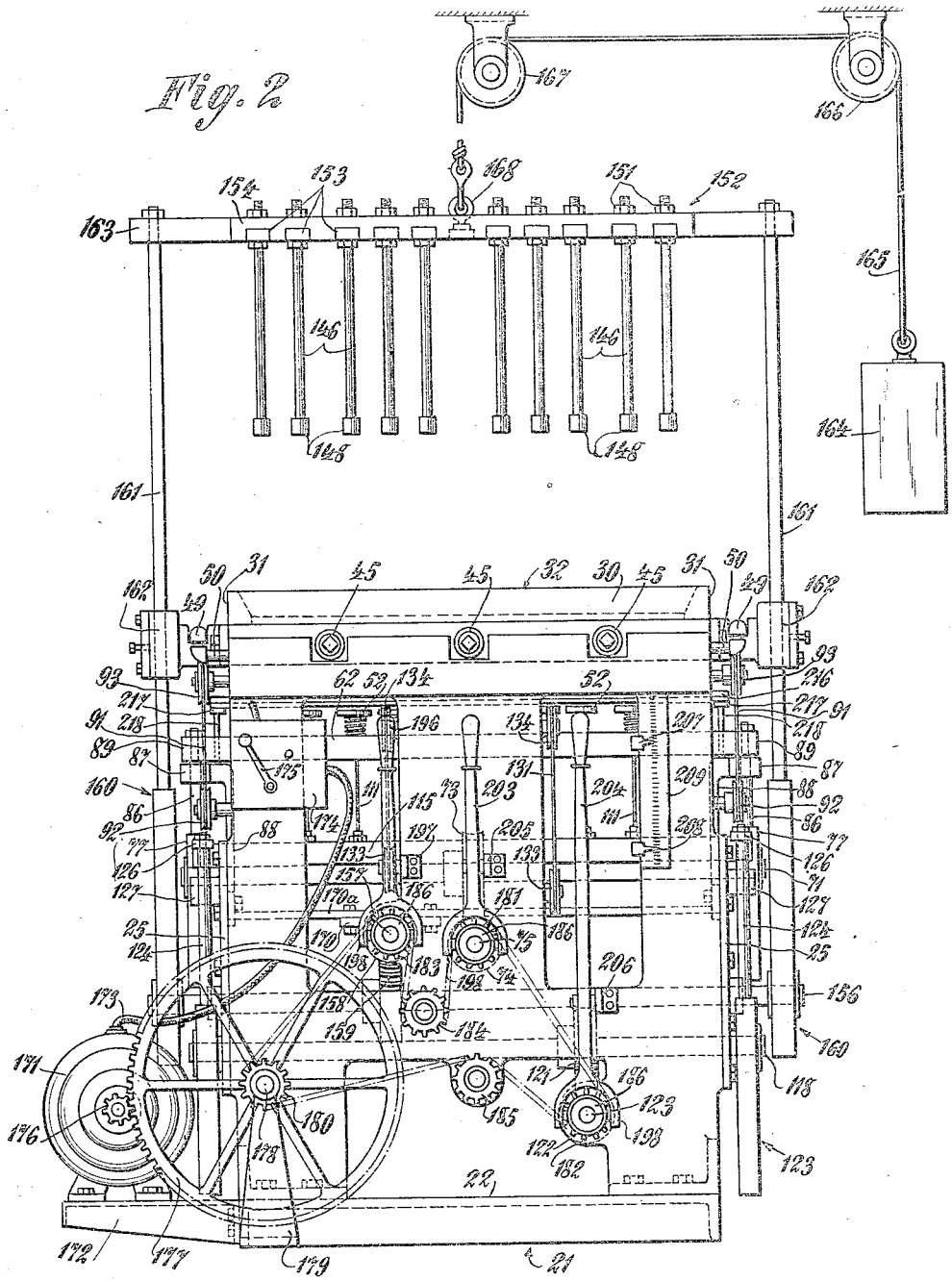
Fig. 2 is a similar view of the head end of the machine.
Figure 3:
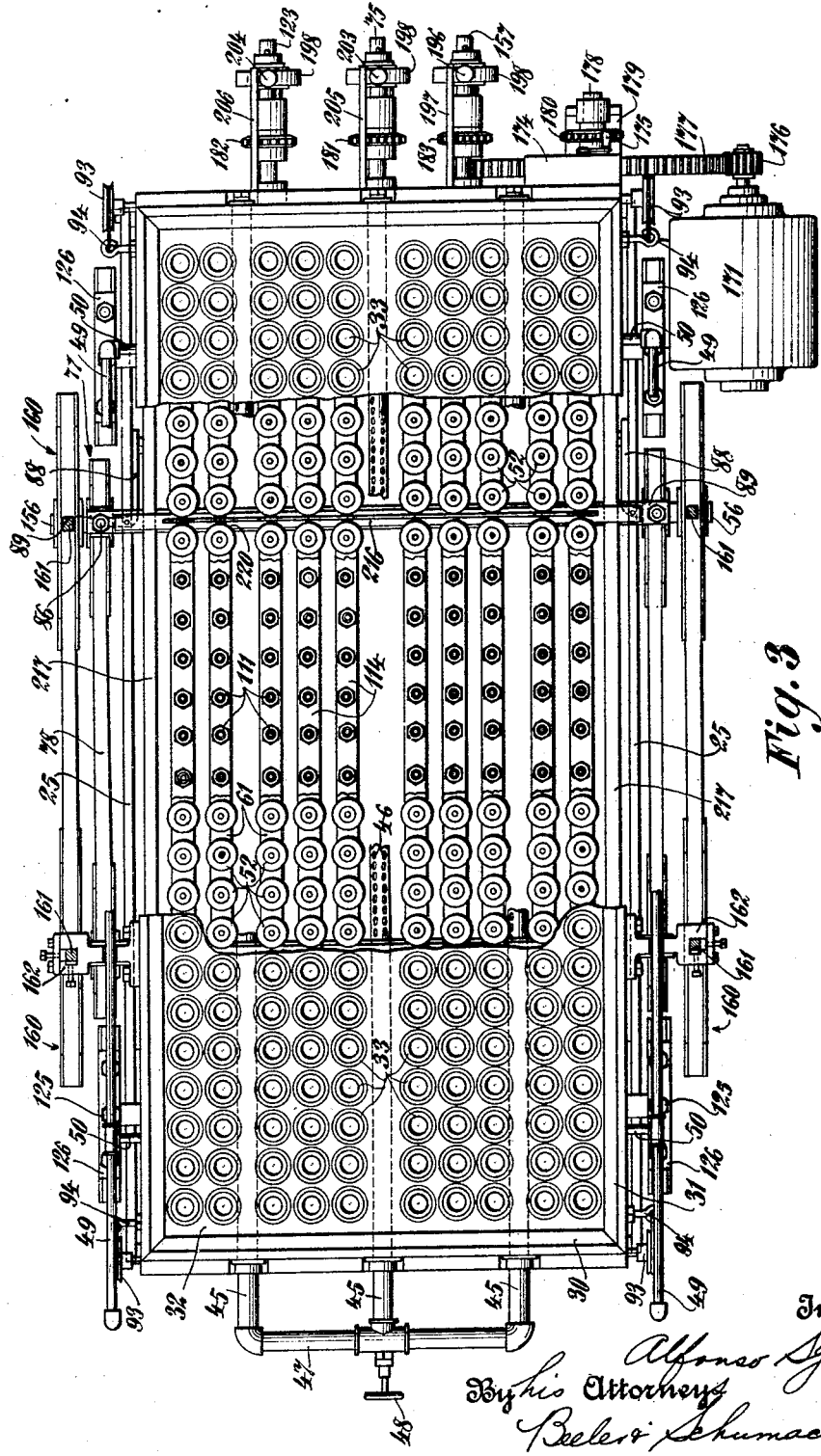
Fig. 3 is a top plan view of the machine taken on the line 3—3 of Fig. 1, with certain parts removed to show top plan views of the machine at lower elevations.

The range of movement of the hammers 146 is illustrated in Fig. 2, showing an uppermost position, and in Fig. 15 showing a lowermost position. In Fig. 18 the hammers are shown at one point in the path of travel thereof. The specific action of the hammers will be described in detail hereinafter.

Referring to the main shaft 157, it will be understood that to prevent deflection of same, a central bearing 170 may be provided therefor, the same being mounted on a bar 170a extending across the machine.

All the cams described are positive acting, due to the use of counterweights. The power to operate the machine is thus reduced to a minimum.

The machine is driven by an electric motor 171 positioned on a base 172 secured to the machine frame. Electrical connections 173 lead from the motor to a rheostat 174 operated by an arm 175. The motor has a pinion 176, the teeth of which mesh with those of a speed reduction gear 177, mounted on a shaft 178 that is journaled in a bracket 179. Driven by the shaft 178 is a sprocket wheel 180. Each of the main shafts 75, 123, and 157 is provided with sprockets 181, 182, and 183, respectively. A chain drive interconnects sprockets 180 to 183. Idlers 184, 185 may be provided. Suitable clutches 186 permit any one of the main shafts to be individually driven as desired.

In Fig. 11 is shown a typical detail of a clutch 186, as applied to main shaft 157. The pinion 183 is freely journaled for rotation thereon, and has an enlarged hub 187. The said hub is formed with a plurality of bores 188 the axes of which lie in a cylinder concentric with the shaft 157. To one side of the member 183 is a collar 189 secured to the said shaft by a set screw 190, and to the other side thereof is a sleeve 191 secured to the shaft by a set screw 192. The sleeve 191 has passages 193 adapted to register with 188. Slidingly carried in the passages 193 are a plurality of pins 194 which are secured to a clutch collar 195 for movement as a unit. The member 195 is slidable on shaft 157 under actuation of a lever 196 pivotally mounted on a bracket 197. The lower end of the lever is formed in a yoke 198, from which extend pins 199 carrying rollers 200 that ride in circular groove 201 in the member 195. On moving the latter toward the left, pins 194 are engaged with the gear 183 and the shaft 157 caused to rotate. In Fig. 11, the clutch is shown in idle position. A stop pin 202 on the end of shaft 157 coacts with the member 195.

Levers 203 and 204 similar to 196 are provided for main shafts 75 and 123 and are pivoted at 205 and 206, respectively.

To indicate to the operator the elevational position of the closure members 52 and pins 111, pointers 207, 208 are provided, carried by their respective tables. A scale 209 on the machine frame has suitable indicia to show to the operator when one of the tables referred to has reached the end of its path of travel. No indicator is needed for the hammers 146, since these can be directly observed.

Referring now to Figs. 9 and 10, the clip 145 is made of metal, preferably as a stamping. It is substantially triangular in form, the corner portions being bent at right angles to form prongs 210. The latter are arcuate in form for effectively gripping the candle. At the center of the clip, a plurality of prongs 211 are struck in an opposite direction to permit a wick to be threaded therethrough, and to be engaged by the prongs 211.

In Fig. 19 is shown the completed candle, the same having the countersink 57 for easy reception of the wick 58. The opening 136 in the candle will be understood to be considerably larger than the wick, and the burning of the candle is believed to be improved thereby. The clip 145 is at the bottom of the candle and engages the lower end of the wick.

The operation of the machine will now be clearly apparent. In Fig. 8 is shown the molding apparatus in position to receive the wax. The molten wax is poured into the pan 32 to a depth corresponding to the angle 212 of the walls 30, 31 of the said pan.

Fig. 12 shows the next step in the operation of the machine, the pins 111 having been slightly lowered, to permit the excess wax to be scraped free as shown at 213.

Fig. 13 illustrates the pins 111 again fully elevated, and the clips 145 placed thereon.

Fig. 14 shows the next step of bringing the hammers 146 down on the candles, causing the clips to be passed down over the pins, spreading the prongs 211 to subsequently freely receive the wick.

Fig. 15 shows the hammers 146 in their lowermost positions, the candles being depressed, and the closure members 52 moved downward to bear on the abutment sleeves 105, the springs 100 being deflected, and the said clips struck into secure engagement with the candles. The central hole in the clip is thus accurately alined with the opening in the candle. The countersink 150 in the hammers provides for the reception of the prong 211.

Fig. 16 shows the hammers 146 elevated and the pins 111 lowered, the candles and closure members 52 being raised by springs 100 to initial position.

Fig. 17 indicates the subsequent step of lowering the closure caps 52, the candles being frictionally retained in the molds.

Fig. 18 shows the final step of placing trays 215 under the molds and above the closure members 52, the hammers 146 being again brought down to tap the candles out of the molds and into the said trays.

The trays 215 are shallow, and of any well known type, and therefore shown herein only in dotted lines. They are adapted to be removably mounted on permanent supports in the machine, these including inverted T-bars 216 extending transversely of the machine, and resting on bars 217 extending along the sides of the machine. The latter are mounted on vertical rods 218 which extend slidably through cross bars 62, the lower ends of the rods resting on brackets 88 and 219. The trays are adapted to rest on the horizontal flanges of the T bars and between the vertical flanges thereof. While the candles are being manufactured, the trays are removed. When the closure members are moved upwardly to the molds 33, they pass the T-bars, since the latter are notched at 220.

As the table for the closure members continues to ascend, the cross bars 62 come into abutment relation with the bars 217 at the undersides thereof and may slightly elevate the same. This, however, is a minor detail in the operation of the machine.

It will thus be seen that the machine fulfills the several objects of the invention and is well adapted to meet the conditions of practical use.

I claim:

1. A machine for molding candles, or the like, including a mold, a pin axially positioned in the mold, means to reciprocate the pin in the mold and means to apply a clip to the candle with the pin as a guide.

2. A machine for molding candles, or the like, including a mold, the mold having a movable bottom closure, resilient means for moving the closure toward the mold, a core pin movable through said bottom closure and axially into the mold, means to strike a wick clip onto the end of the candle at the upper end of the mold, the last mentioned means causing the candle to momentarily depress said bottom closure against the force of the resilient means, and loosening the candle in the mold, said resilient means returning the closure member and candle upward, and means to move the bottom closure away from the mold to permit the candle to be removed therefrom.

3. A machine for molding hollow articles of comparatively soft, fusible material, including a mold, said mold being open at the top thereof to receive the melted material, a core in the mold, a movable closure for the bottom of the mold, having snug fitting engagement therewith, said core projecting through the top of the mold through said closure, said core being removable from the mold, and means to simultaneously pass a clip over the core into engagement with the article and to loosen the article in the mold.

4. A machine of the character described, including a mold for a tapered candle, the lower part of the mold being larger than the upper, a movable core pin in the mold, a movable closure member for the bottom of the mold, means holding said closure member in engagement with the mold, the mold being open at the top, means to strike a wick clip on the candle at the top thereof, means to move the closure member entirely away from the mold, and means adapted to be inserted over the closure member to receive the candle from the mold, the means for striking the clip being movable to depress the candle out of the mold to drop into the receiving means.

5. A machine for making a night candle including a mold for the same, said mold having a plurality of end openings, a closure member for one of said openings movable therefrom, and means to apply a clip for a wick to the candle through the other opening and to strike the candle from the mold through the first mentioned opening.

In testimony whereof I affix my signature.

ALFONSO SGRITTA.